United States Patent [19]

Hirano et al.

[11] Patent Number: 5,206,772

[45] Date of Patent: Apr. 27, 1993

[54] MAGNETIC DISK APPARATUS HAVING IMPROVED ARRANGEMENT OF HEAD DISK ASSEMBLIES

[75] Inventors: Yoshiyuki Hirano, Yono; Tsuyoshi Takahashi, Odawara; Jun Naruse, Odawara; Kazuo Nakagoshi, Odawara, all of Japan

[73] Assignee: Hitachi, Ltd., Tokyo, Japan

[21] Appl. No.: 638,822

[22] Filed: Jan. 8, 1991

Related U.S. Application Data

[63] Continuation-in-part of Ser. No. 415,987, Oct. 2, 1989, abandoned, which is a continuation of Ser. No. 733,008, Jul. 19, 1991, Pat. No. 5,173,819.

[30] Foreign Application Priority Data

Jan. 19, 1990 [JP] Japan .................................... 2-8327

[51] Int. Cl.$^5$ ............................................. G11B 5/12
[52] U.S. Cl. .................................. 360/98.01; 361/384
[58] Field of Search ............... 360/98.01, 98.02, 98.04, 360/98.06, 92, 133; 361/384, 429; 211/26, 40; 369/34, 35, 75.1, 292

[56] References Cited

U.S. PATENT DOCUMENTS 4,967,155 10/1990 Magnuson ..................... 361/384 X

OTHER PUBLICATIONS

"Report on Researches and Ways of Application", vol. 31, No. 1 (1982) pp. 305-316 (FIG. 14), issue from Nippon Telegraph and Telephone Public Corporation Institute for Research of Electrical Communication.

Primary Examiner—A. J. Heinz
Attorney, Agent, or Firm—Kenyon & Kenyon

[57] ABSTRACT

A magnetic head disk apparatus has a housing with one thicknesswise end providing the front side and the other thicknesswise end providing the rear side of the apparatus. The apparatus further has a plurality of head disk assemblies each including at least one combination of a magnetic head and a magnetic disk. The head disk assemblies are arranged in a plurality of rows not only in heightwise and breadthwise directions but also in the thicknesswise direction of the housing. With this arrangement, it is possible to accommodate a multiplicity of head disk assemblies with a high space factor in the housing.

8 Claims, 7 Drawing Sheets

MAGNETIC DISK APPARATUS HAVING IMPROVED ARRANGEMENT OF HEAD DISK ASSEMBLIES

This application is a continuation-in-part of U.S. Patent application Ser. No. 07/415,987, filed Oct. 02, 1989 and now abandoned U.S. Patent application Ser. No. 07/915,987, which is now FWC SN 07/733,088, filed Jul. 7, 1991 now U.S. Pat. No. 517,3819.

BACKGROUND OF THE INVENTION

The present invention relates to a magnetic disk apparatus and, more particularly, to a magnetic disk apparatus which has a multiplicity of head disk assemblies in a housing.

Magnetic disk apparatuses are known having a plurality of head disk assemblies in a housing. An example of such an apparatus is disclosed in "REPORT ON RESEARCHES AND WAYS OF APPLICATION", Vol. 31., No. 1 (1982) pp 305–316 (FIG. 14), issued from Nippon Telegraph and Telephone Public Corporation Institute for Research of Electrical Communication. In this apparatus, head disk assemblies are arranged two-dimensionally, i.e., in a plurality of rows both in the breadthwise direction and heightwise direction of the housing as viewed from the front side of the housing but not in the thicknesswise direction which is perpendicular both to the breadthwise and heightwise directions.

In this apparatus, the number of head disk assemblies which can be accommodated in a housing is limited by the breadth and height of the housing. Therefore, the rate of utilization of a given space is undesirably limited. In order to accommodate a greater number of head disk assemblies, it is important to increase the breadth and/or the height of the housing. Such a large housing, however, requires a large installation space.

The number of the head disk assemblies accommodated in the housing can also be increased by reducing the size of the head disk assembly. In such a case, the size of the two-dimensional arrangement of the head disk assemblies is correspondingly decreased also in the thicknesswise direction of the housing. A housing having such a reduced thickness may fail to provide a neat impression of design of a system when the housing is set side-by-side to other components of the system such as a controller.

SUMMARY OF THE INVENTION

Accordingly, the present invention provides a magnetic disk apparatus in which a large number of head disk assemblies are accommodated in a housing at a high space factor without requiring the size of the housing to be significantly increased, and which offers various advantages such as easy replacement of a head disk assembly in trouble without stopping operation of other assemblies, efficient cooling of the disk assemblies through uniform supply of cooling air to all the head disk assemblies, and realization of a lessexpensive cable unit through simplification of cable arrangements to the head disk assemblies. According to the present invention, a magnetic disk apparatus is provided in which magnetic disk assemblies are arranged in a housing in a plurality of rows not only in the breadthwise and heightwise directions but also in the thicknesswise direction of the housing, preferably to form two rows of the head disk assemblies in the thicknesswise direction in which the assemblies are insertable and withdrawable.

In a preferred form of the present invention, cooling air is introduced to a space between two rows of the head disk assemblies and distributed to both rows so as to flow around the head disk assemblies of both rows and evenly discharged to the front and rear sides of the front and rear rows of the head disk assemblies.

Electrical wiring to the head disk assemblies are laid to extend vertically and horizontally at the thicknesswise mid region in the housing so as to be connected to the head disk assemblies of the front row and rear row, thus attaining a symmetrical wiring arrangement.

In the magnetic disk apparatus of the present invention having the described features, the limited space in the housing is effectively utilized since the head disk assemblies are arranged in two rows which oppose each other in the thicknesswise direction of the housing.

According to the invention, each of the head disk assemblies of the front row can be withdrawn and inserted from the front side of the apparatus, without requiring the corresponding head disk assembly in the rear row to be demounted. Likewise, each of the head disk assemblies of the rear row can be withdrawn and inserted from the rear side of the apparatus without requiring demounting of the corresponding head disk assembly of the front row. Thus, any head disk assembly in trouble can be replaced without requiring suspension of operation any other head disk assembly.

Furthermore, since cooling air is evenly distributed to the front and rear rows of the head disk assemblies from the thicknesswise midst region of the housing, all the head disk assemblies in both rows can equally be cooled.

In addition, the construction of the cable unit can be simplified because the cable wires can be laid in symmetry to the head disk assemblies of the front and rear rows through the thicknesswise midst region in the housing.

DESCRIPTION OF THE PREFERRED EMBODIMENT

A preferred embodiment of the present invention will be described with reference to FIGS. 1 to 7.

Figure 1:
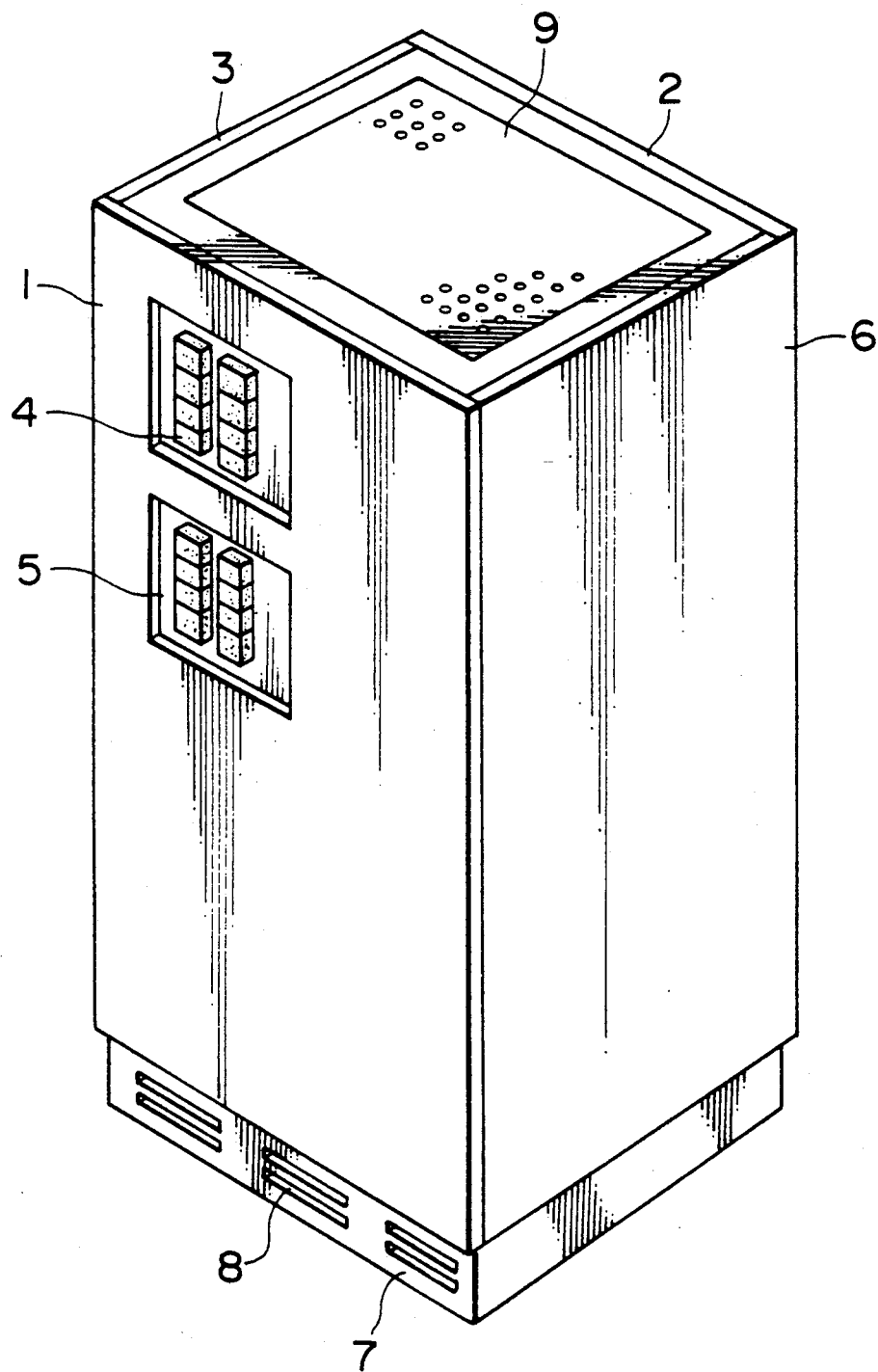
FIG. 1 is a perspective view of an embodiment of the magnetic disk apparatus of the present invention.

Referring first to FIG. 1, a magnetic disk apparatus embodying the present invention has a housing composed of a framework 11 and enclosure walls including a front door 1, a rear door 2 and side covers 3, 6. To the front door 1 are attached operator panels 4, 5. Various operations described later are conducted and controlled through switches which are arranged on these operator panels 4, 5. More specifically, the operator panel 4 is for a front row of head disk assemblies which will be described later, while the operator panel 5 is for a rear row of head disk assemblies which also will be described later. The front and rear covers 1 and 2 are adapted to be opened whenever necessary for the purpose of, for example, a maintenance work, to make the interior of the housing accessible both from the front and rear sides. In a modified form of this embodiment, the operator panel 5 for the rear row of head disk assemblies is provided on the rear door 2. When a plurality of units of the magnetic disk apparatus of the present invention are arranged side-by-side, the units can be placed in close contact with their side covers 3, 6 removed. Devices in the housing are air-cooled by air which is sucked into the housing through slits 8 formed in a skirt 7 provided on the lower end portion of the housing. The air is then discharged through apertures formed in a top cover 9 of the housing. The apertures, which are about 3 mm in diameter, are dispersed over the area of the top cover 9 to facilitate discharge of the air after the cooling.

Figure 2:
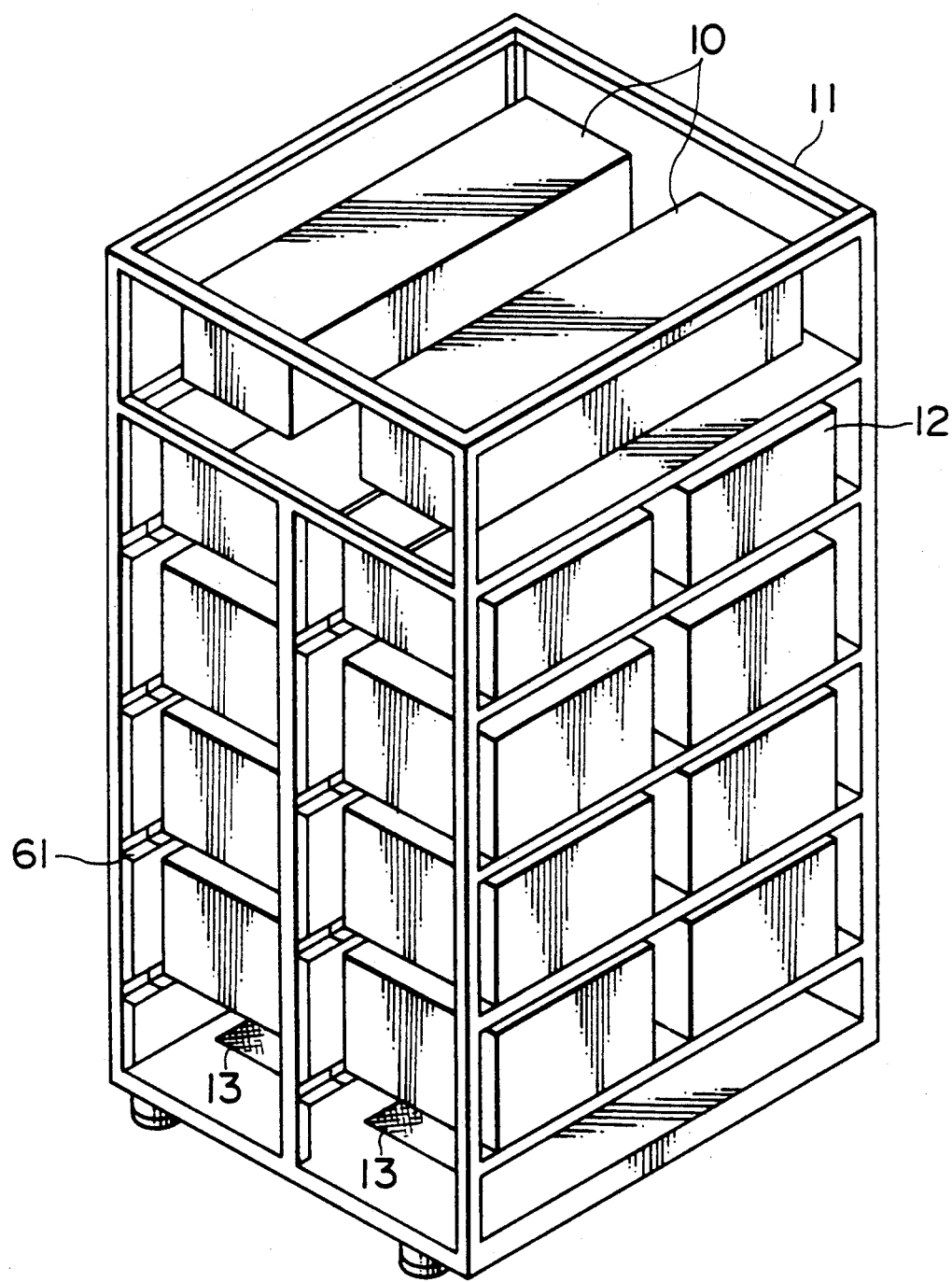
FIG. 2 is a perspective view showing the arrangement of head disk units and power supply units.

FIG. 2 is a perspective view of the apparatus with the front and rear doors 1, 2, side covers 3, 6, the top cover 9 and the skirt 7 being removed to show the interior of the housing, thus illustrating the arrangement of units inside the housing. All the components or units inside the housing are carried by the framework 11 which are constructed to provide a plurality of stages. A pair of power supply units 10 are mounted on the uppermost stage of the frame work 11. The apparatus has a plurality of head disk assemblies. An electronic circuit is connected to each head disk assembly, as will be described later in connection with FIG. 4. Each head disk assembly and the associated electronic circuit form a head disk assembly unit (abridged as HDU, hereafter) denoted by 12. The HDU 12 forms a module which is replaceable as a unit. Thus, in the described embodiment, the head disk assemblies are mounted in the form of HDUs 12. The HDUs 12 are arranged on four stages under each power supply unit 10 carried by the uppermost stage. Each stage carries two HDUs 12, one on the front side and the other on the rear side of the apparatus. Thus, there are eight HDUs 12 under each power supply unit 10, and each power supply unit 10 supplies these eight HDUs 12 with electrical power. It will be seen that, in the illustrated embodiment, 16 HDUs are mounted in the housing.

A pair of filters 13 are disposed at the lowermost portion of the framework 11 so that the air sucked through the slits 8 in the skirt 7 is filtered before entering the interior of the apparatus.

A description will now be given of the constructions of the components in the apparatus.

Figure 3:
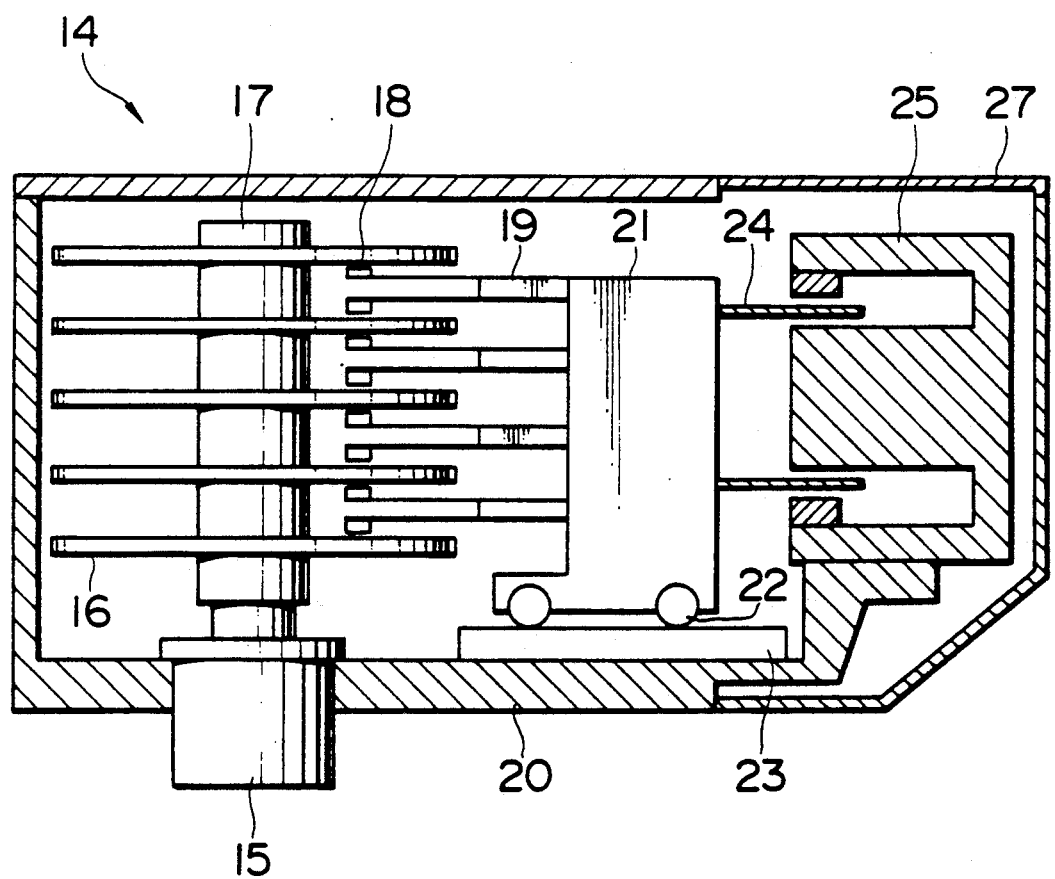
FIG. 3 is a sectional view of a head disk assembly.

Referring to FIG. 3 which is a sectional view of a head disk assembly 14 in each HDU 12, the head disk assembly 14 has a spindle 17 which is directly coupled to a motor 15. A plurality of magnetic disks 16 are carried by the spindle 17. The motor 15 is fixed to the base 20. The head disk assembly 14 also has a plurality of magnetic heads 18 which are supported by free ends of head arms 19. The head arms 19 are supported by a carriage 21 which are supported by ball bearings 22 for a linear movement along rails 23 on which the ball bearings 22 roll. The rails 23 are laid on and fixed to the base 20. A coil 24 is attached to the end of the carriage 21 opposite to the head arms 19. A yoke member forming a magnetic circuit 25 is fixed to the base 20 so as to surround the coil 24. The coil 24 and the magnetic circuit 25 in cooperation form a so-called voice coil motor which generates thrust when the coil 24 is supplied with an electric current. The heads and disks are hermetically sealed by a cover 27. In operation, the magnetic heads 18 are moved linearly and horizontally by the thrust generated by the voice coil motor so as to be located in desired tracks on the magnetic disks 16 which are rotated by the motor 15. This operation is conducted under a track servo control which is known per se. The magnetic heads 18 write information on the disks 16 or read information therefrom, thus serving as memory devices.

Figure 4:
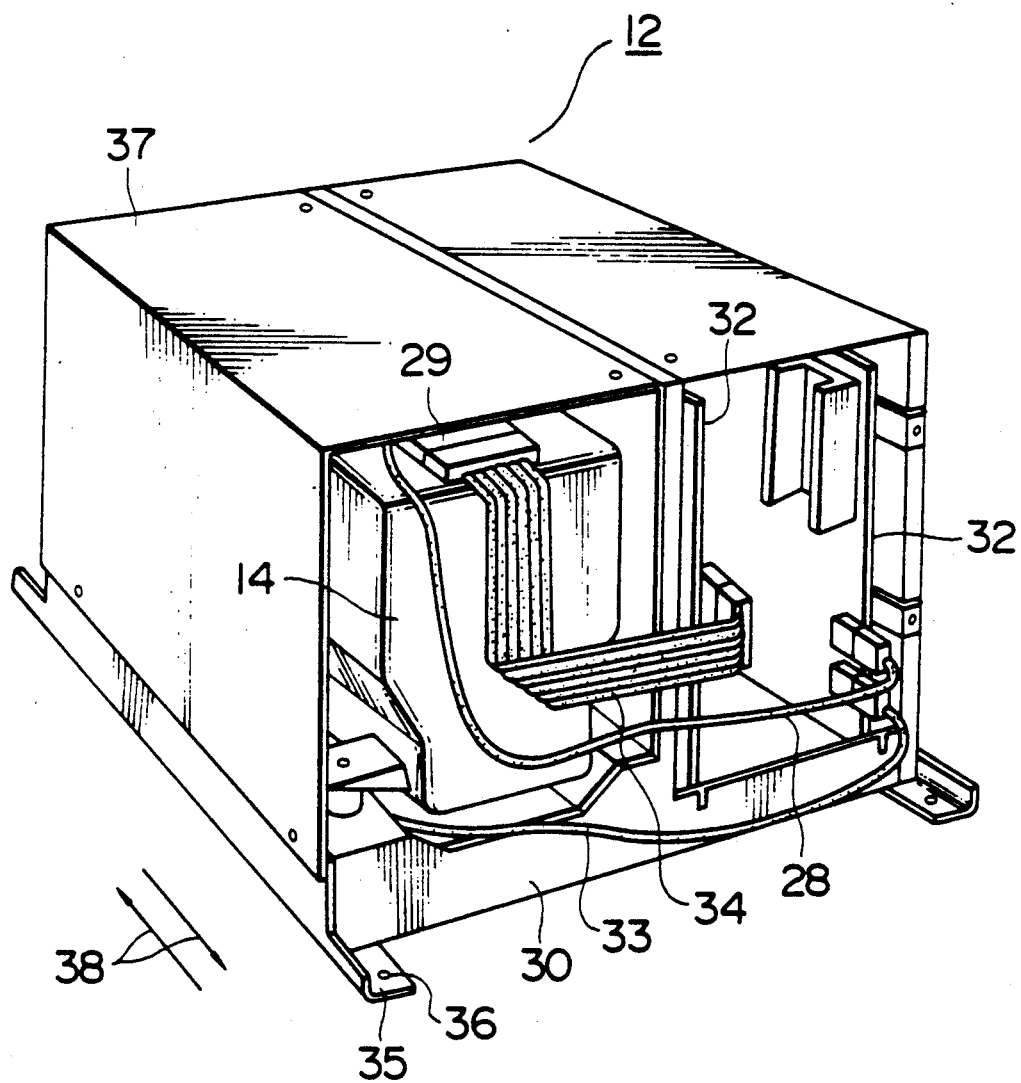
FIG. 4 is a perspective view of a head disk unit.

As will be seen from FIG. 4 which is a perspective view of the HDU 12, the HDU 12 has a frame 30 made of an iron sheet. The frame 30 defines two chambers. One of these two chambers receives the head disk assembly 14, while the other mounts an electronic circuit package 32. The HDU 12 has an HDU mounting plate 35 with mounting holes 36 by means of which the HDU 12 is secured to HDU frame members 61 of the housing (see FIGS. 2 and 5). The package 32 is supplied with electrical power from the power supply unit 10 (see FIG. 2) and is connected to a commanding device through an interface cable which is coupled to the HDU 12 through a connector provided on the front side of the HDU 12. Numerals 28, 33 and 34 denote cables, while 29 designates a cable connector. The HDU 12 has a cover 37 which is opened at the front and rear sides of the HDU 12. Cooling air is introduced into and discharged from the interior of the cover 37 through these openings in the direction of any one of two arrows 38 so as to cool the head disk assembly 14 and the package 32.

Figure 5:
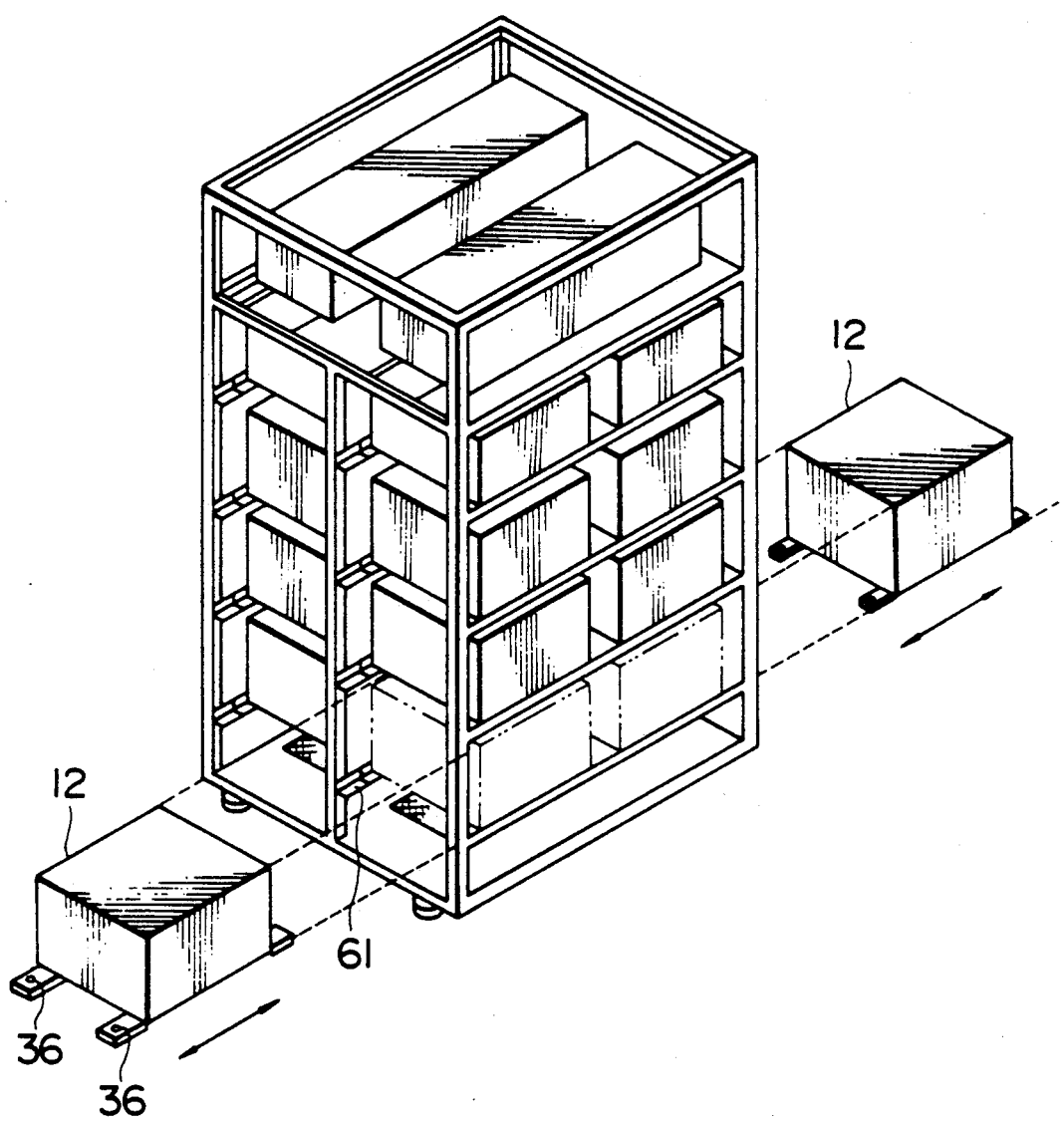
FIG. 5 is a perspective view of the apparatus illustrative of the directions of insertion and withdrawal of the head disk units.

FIG. 5 illustrates the manner in which the head disk assemblies are mounted and demounted. As explained before, in the illustrated embodiment, the head disk assembly 14 is replaced together with the package 32, i.e., on the basis of the HDU 12. The HDU 12 is slidable on the HDU frame members 61 of the housing and is secured by screws driven through the mounting holes 36. The demounting of the HDU 12 is conducted in reverse order. According to the present invention, the HDUs 12 of the front row adjacent the front side of the apparatus are accessible for mounting and demounting from the front side of the apparatus. Similarly, the HDUs 12 of the rear row adjacent the rear side of the apparatus are accessible from the rear side of the apparatus. Thus, the HDUs 12 of the front row and the HDUs 12 of the rear row are arranged in symmetry in face-to-face relation.

Figure 6:
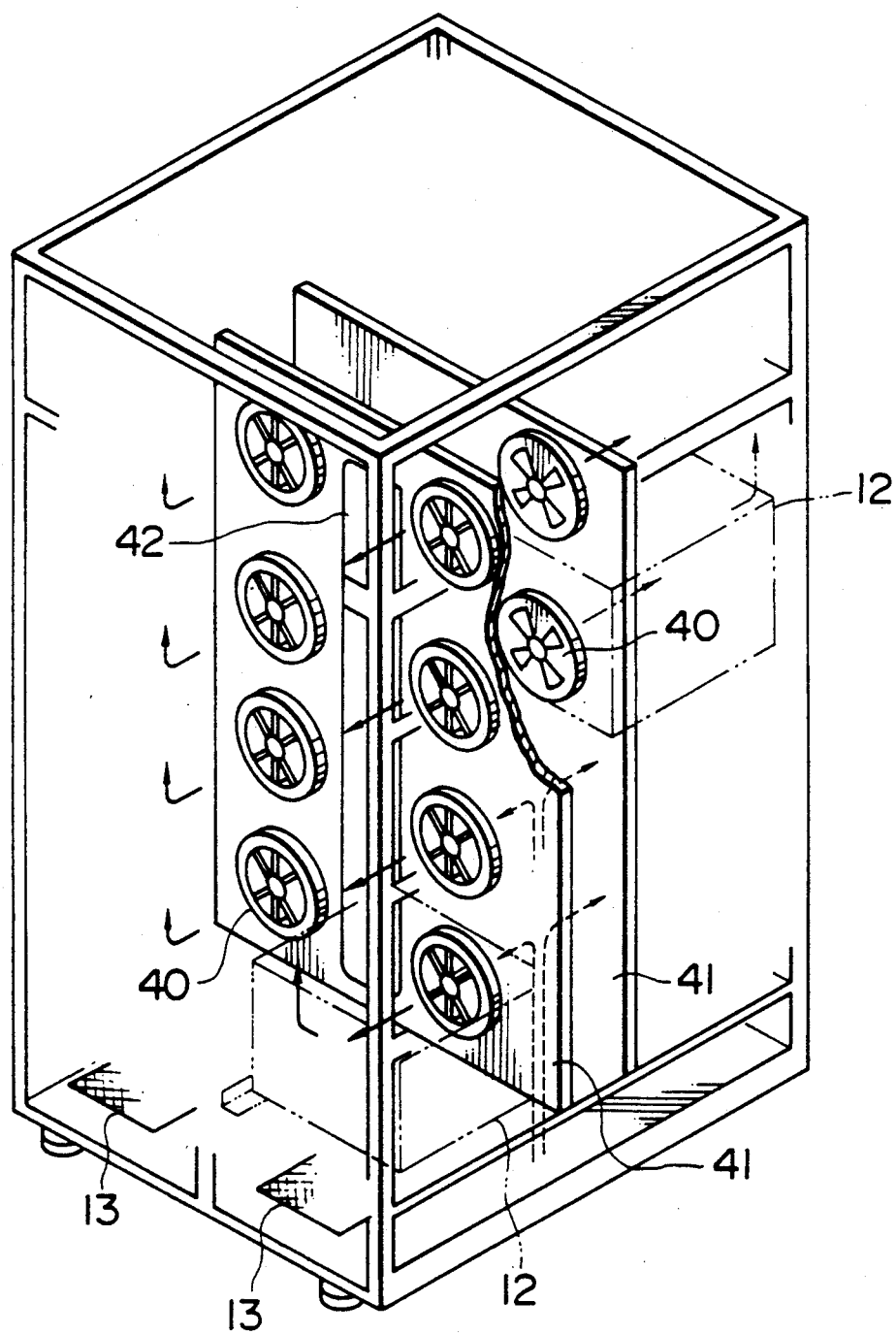
FIG. 6 is a perspective view of the apparatus illustrative of a cooling air system.

A description will now be given of the air cooling system for cooling the apparatus with reference to FIG. 6. In this FIG., components and parts other than those of the cooling air system are shown only diagrammatically. The cooling system has a pair of fan mounting plates 41 disposed in the thicknesswise central region of the housing and spaced from each other in the thicknesswise direction. Each fan mounting plate 41 carries a plurality of cooling fans 40. An air inlet is formed between the spaced ends of the fan mounting plates 41. In operation, air is introduced by the fans 40 through the air filters 13 on the bottom of the apparatus which enters the space between two fan mounting plates 41 past the inlet formed between the lower ends of both fan mounting plates 41. The air then ascends the space between both fan mounting plates 41 so as to reach the respective cooling fans 40. Apertures 42 are formed in each fan mounting plate 41 so as to provide passages for later-mentioned cables. In the illustrated embodiment, eight cooling fans 41 are provided on each fan mounting plate 41, so that there are 16 cooling fans 40 in total. The cooling fans 40 on the fan mounting plate 41 adjacent the front side of the apparatus are arranged to direct the cooling air to the HDUs 12 of the front row, while the cooling fans 40 on the fan mounting plate 41 adjacent the rear side of the apparatus are arranged to direct the cooling air to the HDUs 12 of the rear row. The air therefore flows through the space defined by the cover 37 of each HDU 12 so as to cool the head disk assembly 14 and the package 32. Thus, in the illustrated embodiment, the cooling air which has cooled the HDUs 12 of the front row is discharged to the space between these HDUs 12 and the front door 1. Likewise, the air which has cooled the HDUs 12 of the rear row is discharged to the space between these HDUs 12 and the rear door 2. The air then ascends these spaces to reach the space where the power supply units 10 are disposed and is finally discharged to the exterior of the apparatus through the apertures formed in the top cover 6. In FIG. 6, only two of the HDUs 12 are shown to clarify the drawing.

Figure 7:
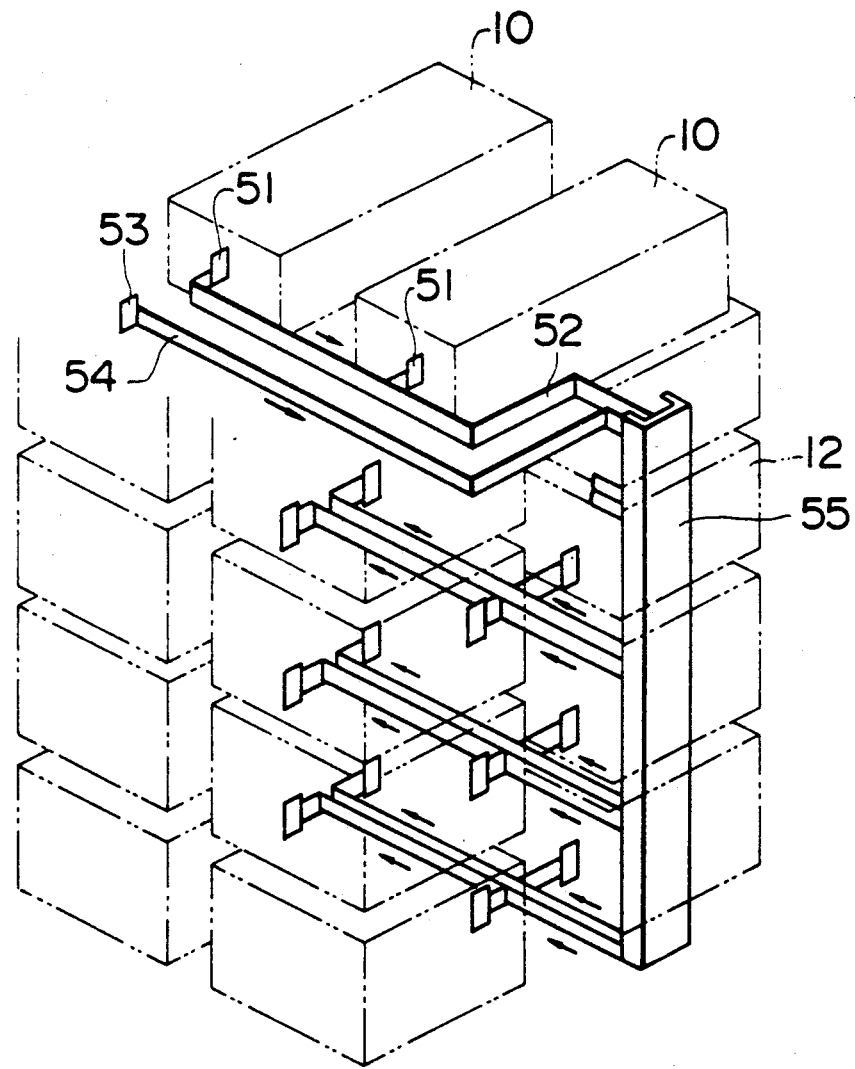
FIG. 7 is a perspective view of the apparatus illustrative of the cable arrangement.

FIG. 7 shows the arrangement of cables for electrical power and signals. Electrical power is supplied from the power supply units 10 to the HDUs 12 via power connectors 51 and power cables 52 as indicated by arrows. Signals from a controller are delivered to signal cables 54 through signal connectors 53 attached to the housing.

The power cables 52 and the signal cables 54 are assembled together within the cable frame 55. The cable frame 55 extends vertically in the space which is thicknesswise midst of the apparatus, i.e., between the front and rear rows of the HDUs 12. Cables branch off the cable frame 55 at the levels of respective stages of the HDUs 12 so as to extend horizontally through the space between two fan mounting plates 41 and are led symmetrically to the respective HDUs 12 of the front and rear rows through the apertures 42 formed in the fan mounting plates 41.

As will be understood from the foregoing description, the present invention offers various advantages. Firstly, the limited space in a housing of a given size can be efficiently utilized by the fact that the head disk assemblies are arranged in a plurality of rows not only in the heightwise and breadthwise directions of the housing but also in the thicknesswise direction of the same. Secondly, any HDU in trouble can be demounted and a new HDU can be mounted easily without requiring suspension of operation of any other head disk assembly, because all the HDUs are directly accessible either from the front or the rear side of the apparatus. Thirdly, all the head disk assemblies are equally cooled because the cooling air is evenly distributed to the head disk assemblies of the front and rear rows from the thicknesswise midst region of the housing.

Finally, the construction of the cable unit is simplified because the cables are laid in symmetry to lead to the head disk assemblies of the front and rear sides through the space which is midst of the housing of the apparatus in the thicknesswise direction.

What is claimed is:
1. A magnetic disk apparatus comprising:
   a housing having a front side, a rear side, a top side, a bottom side and a longitudinal axis running perpendicular to and intersecting said front side and said rear side;
   a plurality of head disk units arranged in said housing in a plurality of rows including at least front and rear rows which are spaced from each other in a direction of said longitudinal axis and forming a front space between said front row of the head disk units and said front side of the housing and a rear space between said rear row of the head disk units and said rear side of the housing, each of said plurality of head disk units including a head disk assembly and a control circuit board, each of said head disk units being surrounded by a cover in each direction except two longitudinal sides of the head disk unit which are intersected in a perpendicular manner by said longitudinal axis or by a line parallel to said longitudinal axis which runs perpendicular to and intersects said front side and said rear side so as to provide a longitudinal air passage through each of said head disk units via said two longitudinal sides;
   a central air passage provided near a center of said housing in such a manner as to space adjacent front and rear rows of said head disk units, said central air passage communicating with an outer space of the housing through the bottom side of the housing;
   fans introducing air front said central air passage into said longitudinal air passage of each head disk unit so as to discharge the air to the top side of the housing through said front space or aid rear space;
   one or more power sources supplying power to said head disk units, mounted in said housing above said plurality of head disk units; and
   a discharge opening provided in the vicinity of the top side of the housing through which said air discharged to the top side of the housing is discharged from said housing.

2. A magnetic disk apparatus according to claim 1, wherein said central air passage communicates with an outer space through filters provided on the bottom side of said housing.

3. A magnetic disk apparatus according to claim 2, wherein said discharge opening is a plurality of apertures formed in said top side of the housing.

4. A magnetic disk apparatus according to claim 3, wherein said cover of said head disk units surround said head disk assembly and said control circuit board except on the two longitudinal sides.

5. A magnetic disk apparatus according to claim 4, further comprising a cable frame extending vertically in said housing for accommodating cables connecting between said one or more power sources and said head disk units.

6. A magnetic disk apparatus according to claim 1, wherein each of said plurality of head disk units is directly accessible from either the front side or the rear side of the housing.

7. A magnetic disk apparatus according to claim 1, wherein said discharge opening is provided on the top side of the housing.

8. A magnetic disk apparatus according to claim 1, wherein said head disk units are arranged in three dimensions having a plurality of head disk units in each of a lengthwise, breadthwise and thicknesswise direction of said housing.

* * * * *